United States Patent [19]
Bauer et al.

[11] Patent Number: 6,131,853
[45] Date of Patent: Oct. 17, 2000

[54] MICRO-DRAG GENERATORS FOR AERODYNAMIC AND HYDRODYNAMIC BRAKING AND CONTROL

[76] Inventors: Steven X. S. Bauer, 314 Brook La., Yorktown, Va. 23692; Richard M. Wood, 754 Suffolk La., Virginia Beach, Va. 23452

[21] Appl. No.: 09/328,527

[22] Filed: Jun. 9, 1999

[51] Int. Cl.[7] ............................................. B64C 9/32

[52] U.S. Cl. ..................... 244/113; 244/199; 114/284; 482/13; 180/89.1

[58] Field of Search ..................... 244/113, 198, 244/199, 201; 114/284, 285; D2/731; 482/13; 180/89.1

[56] References Cited

U.S. PATENT DOCUMENTS

| | | | |
|---|---|---|---|
| 4,354,648 | 10/1982 | Schenk et al. | 244/199 |
| 5,058,837 | 10/1991 | Wheeler | 244/199 |
| 5,598,990 | 2/1997 | Farokhi et al. | 244/199 |
| 5,755,408 | 5/1998 | Schmidt et al. | 244/199 |

*Primary Examiner*—J. Woodrow Eldred

[57] ABSTRACT

An apparatus and method for generating large drag forces on an object moving through a gas or liquid for braking and/or turning the object by deploying on the exterior surface of an object a very large number of very small surfaces that are aligned perpendicular to the local surface low direction. The large drag force results from the summation of a very large number of very small drag forces generated by each of the very small surfaces as the local flow separates on the downstream side of each of the very small surfaces. The very large number of very small surfaces of the novel device are selectively actuated and extended into the gas or fluid stream that is moving along the body of an air vehicle, ground vehicle, or water vehicle to produce a large drag value. The present invention is also comprised of a means to retract and stow the very small surfaces that have been extended into the gas or fluid stream passing over the vehicle. The present invention is comprised of a means to actuate each of the very small surfaces. The present invention is comprised of a means to sense a signal indicating the need to actuate the very small surfaces to generate a braking or turning drag force. The novel device comprised of a very large number of very small surfaces may also be fabricated into the form-fitting clothing or uniform of an athlete to produce a large drag value. These small surfaces extend from the exterior surface of the form fitting clothing and extend into the gas or fluid stream that is moving along the body of athlete to create a large drag force that is used for resistance training. The objects and advantages also extend to other applications in which either a gas or fluid is in use such as for the flow in pipes or ducts.

20 Claims, 13 Drawing Sheets

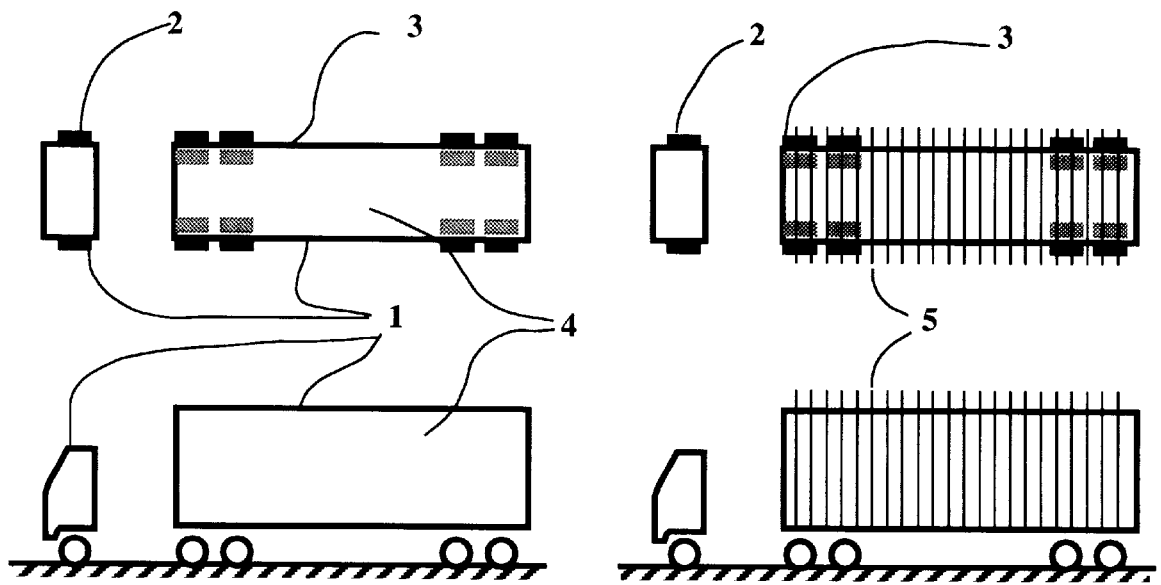
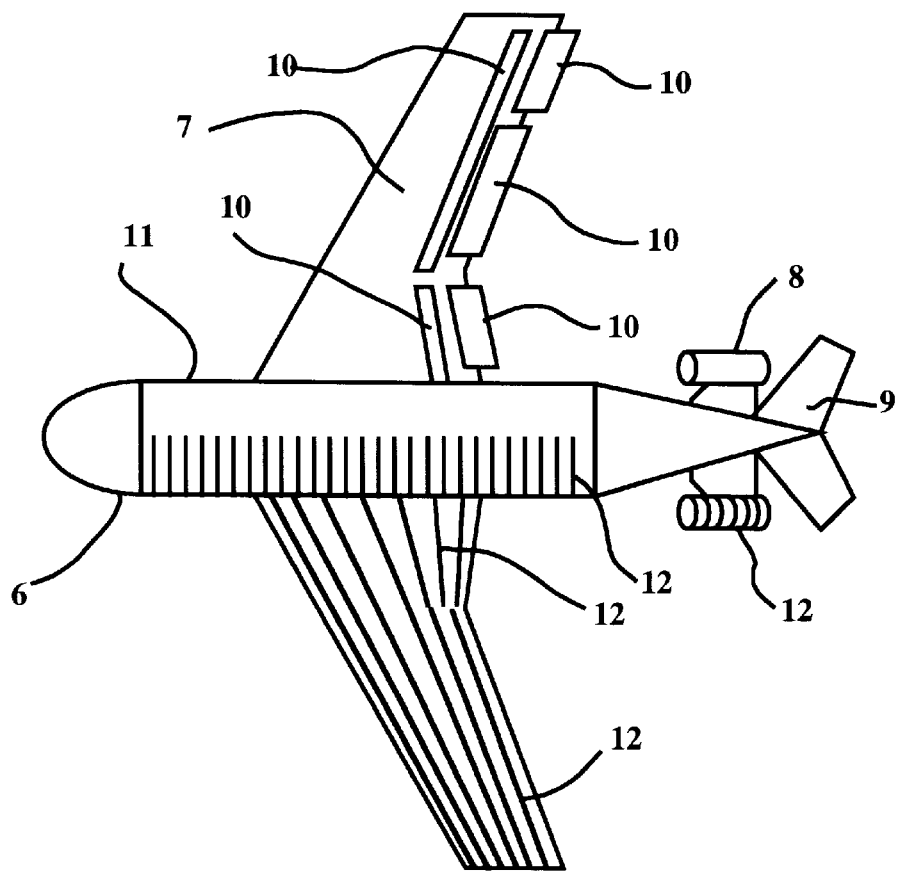

ical and mechanical devices to turn. Water vehicles employed the propulsion system, in reverse operation, to decelerate and employed hydrodynamic drag producing device to decelerate and turn.
MICRO-DRAG GENERATORS FOR AERODYNAMIC AND HYDRODYNAMIC BRAKING AND CONTROL

ORIGIN OF THE INVENTION

The invention described herein was made by employees of the United States Government, and may be manufactured and used by or for the Government without payment of any royalties thereon or therefor.

CROSS-REFERENCE TO RELATED APPLICATIONS

Not applicable.

BACKGROUND—FIELD OF INVENTION

The invention relates to the production of aerodynamic and hydrodynamic drag for air vehicles, ground vehicles, water vehicles, and humans moving through liquid and/or gas, specifically to an improved method and device for the production of aerodynamic and hydrodynamic drag for the braking (deceleration) and/or control (turning) of air vehicles, ground vehicles, water vehicles, and humans moving through liquid and/or gas.

BACKGROUND—DESCRIPTION OF PRIOR ART

All air vehicles, ground vehicles, and water vehicles require the ability to decelerate and turn in order to make them effective, safe, and useful. Typically, air and water vehicles employed devices that interacted with the fluid or gas medium they moved in to decelerate and turn. Ground vehicles have relied upon mechanical friction producing systems for deceleration and turning.

The application to humans is in the area of increasing air and water resistance for an athlete in training. Typically, training regiments include resistance training in which the resistance is provided by means of a mechanical friction or spring based means attached to a single point or limited number of points on the athlete.

Originally, air vehicles, while airborne, employed aerodynamic drag producing devices to decelerate and as one means to turn. Air vehicles, while on the ground, employed both aerodynamic drag producing devices and mechanical friction devices, as well as reversed thrust to decelerate and mechanical devices to turn. Ground vehicles employed mechanical friction devices to decelerate and mechanical devices to turn. Water vehicles employed the propulsion system, in reverse operation, to decelerate and employed hydrodynamic drag producing device to decelerate and turn.

For air vehicles a variety of devices have been created to improve the effectiveness of in-flight deceleration and turning. In flight turning devices varied from the vortex management approach for steering an aircraft of U.S. Pat. No. 4,267,990 to the more conventional aileron of U.S. Pat. No. 4,720,062. A recent invention presented in U.S. Pat. No. 4,717,097 shows an aerodynamic device that combines the ability to provide both aerodynamic control and deceleration. These devices all used large surfaces that are moved into the air stream to create a single large aerodynamic drag force that is used to either brake the vehicle or to control the vehicle. The large size and large motions of the existing devices results in the need for large actuation systems. These actuation systems typically consist of hydraulic or electric actuators that require large internal volumes of the vehicle and are very heavy. Present and especially future military aircraft require low observability to survive in a hostile environment. The existing aerodynamic deceleration and control systems do not meet the observability requirements. The large size and large motions of the present devices negatively impact the observability of military aircraft. Additional negative characteristics of the present devices are that they generate a limited number of large forces on an air vehicle for deceleration and control. In addition, the force generated by varying by these devices is adjusted by varying amount of motion or deflection of the device. This characteristic operation results in the devices performing at less than optimal conditions. The approach to use a limited number of large forces reduces the control options available and the efficiency of the braking and control of the vehicle.

Recent inventions such as that presented in U.S. Pat. No. 4,987,071 has shown the use of vectoring the propulsion system to provide vehicle deceleration and control. These systems utilize either large moving surfaces that project into the engine exhaust flow or utilize large moving surfaces internal of the exhaust nozzle to redirect the flow. These systems are typically very heavy and require large actuation systems. These actuation systems typically consist of hydraulic or electric actuators that require large internal volumes of the vehicle and are very heavy. Additional negative characteristics of the present devices are that they generate a single or limited number of large forces on an air vehicle for deceleration and control. In addition, they vary the force generated by varying the amount of motion or deflection of the device. This characteristic results in the operation of the propulsion system at less than optimal conditions. The approach to use a limited number of large forces reduces the control options available and the efficiency of the braking and control of the vehicle.

Originally, for air vehicles, a variety of devices have been created to improve the effectiveness of on-the-ground deceleration. Recent invention of U.S. Pat. No. 4,717,097 shows a spoiler that is used to decelerate the vehicle after landing. These aerodynamic drag production devices use large surfaces that are moved into the air stream to create a single large aerodynamic drag force that is used to brake the vehicle. The large size and large motions of the existing devices results in the need for large actuation systems. These actuation systems typically consist of hydraulic or electric actuators that require large internal volumes of the vehicle and are very heavy. Additional negative characteristics of the present devices are that they generate a limited number of large forces on an air vehicle for deceleration and control. In addition, they vary the force generated by varying the amount of motion or deflection of the device. This characteristic results in their operation at less than optimal conditions. The approach to use a limited number of large forces reduces the control options available and the efficiency of the braking and control of the vehicle.

Inventions such as that depicted by U.S. Pat. No. 5,103,634 have shown the use of vectoring the propulsion system to provide vehicle deceleration on the ground. These systems utilize large moving surfaces that project into the engine exhaust flow or utilize large moving surfaces internal of the exhaust nozzle to redirect the flow. These systems are typically very heavy and require large actuation systems. These actuation systems typically consist of hydraulic or electric actuators that require large internal volumes of the vehicle and are very heavy. Additional negative characteristics of the present devices are that they generate a limited number of large forces on an air vehicle for deceleration and control. In addition, they vary the force generated by varying the amount of motion or deflection of the device. This characteristic results in their operation at less than optimal conditions. The approach to use a limited number of large forces reduces the control options available and the efficiency of the braking of the vehicle.

Inventions such as U.S. Pat. No. 5,255,761 have shown the use of mechanical friction braking to provide air vehicle deceleration on the ground. These systems utilize large friction forces applied to the wheel housing to decelerate the air vehicle. The mechanical friction braking systems are designed for the extreme condition of stopping the aircraft after it has landed. This design requirement imposes a system that is very large and heavy. This system is carried by the vehicle at all times but used for only a brief fraction of the vehicle life. These friction-braking concepts require significant maintenance. These systems are typically very heavy and require large actuation systems. These actuation systems typically consist of hydraulic or electric actuators that require large internal volumes of the vehicle and are very heavy. Additional negative characteristics of the present devices are that they generate a limited number of large forces on an air vehicle for deceleration and control. These systems also pose a safety hazard on wet or ice covered runways. Over braking can result in a loss in air vehicle control on landing.

Originally, ground vehicles employed mechanical friction braking to provide vehicle deceleration. This class of braking device is depicted in U.S. Pat. Nos. 4,518,067 and 4,925,252. Ground vehicles also employed and continue to employ mechanical control systems that allow for turning of the vehicle as shown in U.S. Pat. No. 4,299,407. The braking systems utilize large friction forces applied to the wheel housing to decelerate the ground vehicle. The mechanical friction braking systems are designed for the extreme condition of stopping the ground vehicle in a safe manner from its fastest driving speed. This design requirement imposes a system that is very large and heavy. These friction-braking concepts require significant maintenance. These systems are typically very heavy and require large actuation systems. These actuation systems typically consist of hydraulic or electric actuators that require internal volumes of the vehicle and are very heavy. Additional negative characteristics of the present devices are that they generate a limited number of large forces on a vehicle for deceleration. These systems also pose a safety hazard on wet or ice covered surfaces. Over braking can result in a loss in vehicle control. These concerns are of even greater importance as the vehicle size and the vehicle weight increase. The braking requirements for trucks, buses, trains, and even vans are much greater than for the passenger car. The braking of the large ground vehicles requires the use of large mechanical friction systems. However even an adequately designed mechanical friction system cannot eliminate the safety concerns associated with braking large ground vehicles by applying a few large loads at the wheels. This approach can create highly unstable situations for the vehicle and result in severe accidents.

Inventions represented by U.S. Pat. No. 4,611,796 have shown a variety of devices have been created to utilize aerodynamic drag for improved braking effectiveness of ground vehicles. These aerodynamic devices all used large surfaces that are moved in the air stream to allow for the creation of a single large aerodynamic drag force that is used to brake the vehicle. The large size and large motions of the existing devices results in the need for large actuation systems. These actuation systems typically consist of hydraulic or electric actuators that require large internal volumes of the vehicle and are very heavy. Additional negative characteristics of the present devices are that they generate a limited number of large forces on an air vehicle for deceleration and control. In addition they vary the force generated by varying the amount of motion or defection of the device. This operational characteristic of these devices results in their operation at less than optimal conditions. The approach to use a limited number of large forces reduces the options available and the reduces the efficiency and safety of the braking and control of the vehicle.

For water vehicles, a variety of devices have been created to improve the effectiveness of deceleration and turning. These devices varied from the hydrodynamic devices shown in U.S. Pat. No. 5,054,410 to the more conventional rudder system shown in U.S. Pat. No. 4,231,309. These devices primarily used large surfaces that are moved into the fluid stream to create a single large hydrodynamic drag force that is used to brake or turn the vehicle. The large size and large motions of the existing devices results in the need for large actuation systems. These actuation systems typically consist of hydraulic or electric actuators that require large internal volumes of the vehicle and are very heavy. Additional negative characteristics of the present devices are that they generate a limited number of large forces on an air vehicle for deceleration and control. In addition, they vary the force generated by varying the amount of motion or deflection of the device. This operational characteristic of these devices results in their operation at less than optimal conditions. The approach to use a limited number of large forces reduces the control options available and the efficiency of the braking and control of the vehicle.

Inventions depicted in U.S. Pat. Nos. 3,756,185 and 5,267,883 have shown the use of vectoring the propulsion system to provide vehicle deceleration and turning. These systems utilize either a redirection of the propulsive force by moving a large surface or by reversing the operation of the propulsion system for maximum braking. These systems are typically very heavy and require large actuation systems. These actuation systems typically consist of hydraulic or electric actuators that require large internal volumes of the vehicle and are very heavy. Additional negative characteristics of the present devices are that they generate a limited number of large forces on an air vehicle for deceleration and control. In addition, they vary the force generated by varying the amount of motion or deflection of the device. This characteristic results in their operation at less than optimal conditions. The approach to use a limited number of large forces reduces the control options available and the efficiency of the braking and control of the vehicle.

All of the existing braking and control systems for air vehicles, ground vehicles, and water vehicles suffer from a number of disadvantages:

(a) The aerodynamic or hydrodynamic devices use large surfaces that are moved into the fluid or gas stream to create a single large drag force that is used to brake or turn the vehicle. The large size and large motions of the existing devices results in the need for large actuation systems. These actuation systems typically consist of hydraulic or electric actuators that require large internal volumes of the vehicle and are very heavy. In addition, they vary the force generated by varying the amount of motion or deflection of the device. This characteristic results in their operation at less than optimal conditions. The approach to use a limited number of large forces reduces the control options available and the efficiency of the braking and control of the vehicle.

(b) The propulsion system devices provide vehicle deceleration and turning by a redirection of the propulsive force by moving a large surface or by reversing the operation of the propulsion system for maximum braking. These systems are typically very heavy and require large actuation systems. These actuation systems typically consist of hydraulic or electric actuators that require large internal volumes of the vehicle and are very heavy. Additional negative characteristics of the present devices are that they generate a limited number of large forces on a vehicle for deceleration and control. In addition, they vary the force generated by varying the amount of motion or deflection of the device. This characteristic results in their operation at less than optimal conditions. The approach to use a limited number of large forces reduces the control options available and the efficiency of the braking and control of the vehicle.

(c) The friction braking systems utilize large loads applied to the wheel housing to decelerate the ground vehicle. The mechanical friction braking systems are designed for the extreme condition of stopping the ground vehicle in a safe manner from its fastest speed. This design requirement imposes a system that is very large, heavy, and robust. These friction-braking concepts require significant maintenance. These systems are typically very heavy and require large actuation systems. These actuation systems typically consist of hydraulic or electric actuators that require internal volumes of the vehicle and are very heavy. Additional negative characteristics of the present devices are that they generate a limited number of large forces on a vehicle for deceleration. These systems also pose a safety hazard on wet or ice covered surfaces. Over braking can result in a loss in vehicle control. These concerns are of even greater importance as the vehicle size and the vehicle weight increase. The braking of the large vehicles requires the use of large mechanical friction systems. However, even an adequately designed mechanical friction system cannot eliminate the safety concerns associated with braking large and heavy vehicles by applying a few large loads at the wheels. This approach can create highly unstable situations for the vehicle and result in severe accidents.

For training athletes in sports in which success is measured by the speed in which the athlete moves through air or water, a variety of devices have been created to provide resistance. Devices for training swimmers varied from the swimming suit with pockets of U.S. Pat. Nos. 4,074,904 and 5,487,710 to a belt with paddles of U.S. Pat. No. 5,002,268. Another concept for swimmer resistance is a tether concept described in U.S. Pat. No. 5,846,167. For bicyclists and runners another concept is presented in U.S. Pat. Nos. 3,993,323 and 5,412,813 that use a parachute that is tethered to the athlete. These devices use either a single large force transmitted to the athlete by means of a tether attached to the athlete at one or a very limited number of points or a small number of large aerodynamic or hydrodynamic drag force that are transmitted to the athlete at a limited number of points. The mechanical based resistance training devices utilize a tether attached from a friction or spring device mounted to a stationary object and connected to the athlete at a single or a limited number of points. The mechanical friction braking systems of some tether-based systems are designed for use in a single direction or for a limited distance based upon the length of the pool or the length of a straight section of road. These systems typically consist of hydraulic or electric mechanisms that are complex and heavy. The aerodynamic and hydrodynamic drag force devices used large surfaces that are pulled through the air or water by the athlete to create the large drag (resistance) force. The large size of the existing aerodynamic and hydrodynamic devices makes them difficult to manage and control the level of the force and the direction that the force acts. These devices are subject to various currents and wind flow directions as well as other outside influences that will disrupt the athlete training activity and may cause injury. The resultant force felt by the athlete with either of these training devices is not consistent with the forces felt by the athlete under actual competition. This change in force will disrupt the natural motion of the body and may cause injury.

All of the existing braking (resistance) training aids for athletes suffer from a number of disadvantages:

(a) The aerodynamic or hydrodynamic resistance devices use large surfaces, such as pockets or parachutes, that is tethered to the athlete at one or a limited number of points and interacts with the air or water behind the athlete to create a single large drag force that is used to provide resistance. The resultant force felt by the athlete is not consistent with the forces felt by the athlete under actual competition. This change in force will disrupt the natural motion of the body and may cause injury. The large size of the existing devices makes them difficult to manage and control the level of the force and the direction that the force acts. These devices are subject to various currents and wind flow directions as well as other outside influences that will disrupt the athlete training activity and may cause injury. These characteristics result in their operation at less than optimal conditions.

(b) The mechanical based resistance training devices utilize a tether attached from a friction or spring device mounted to a stationary object and connected to the athlete at a single or a limited number of points. The mechanical friction braking systems are designed for use in a single direction or for a limited distance based upon the length of the pool or the length of a straight section of road. These resistancetraining concepts require significant maintenance. These systems are typically very heavy and require large actuation systems. Additional negative characteristics of the present devices are that they generate a force at a limited number of locations.

SUMMARY OF THE INVENTION

The present invention pioneers a novel device that is comprised of a very large number of very small surfaces that are selectively actuated and extended into the gas or fluid stream that is moving along the body of the air vehicle, ground vehicle, or water vehicle to produce a large drag value. The present invention is also comprised of a means to retract and stow the very small surfaces that have been extended into the gas or fluid stream passing over the vehicle. The present invention is comprised of a means to actuate each of the very small surfaces. The present invention is comprised of a means to sense a signal indicating the need to actuate the very small surfaces to generate a braking or turning drag force.

The present invention also pioneers a novel device that is comprised of a very large number of very small surfaces that are fabricated into the form-fitting clothing or uniform of an athlete to produce a large drag value. These small surfaces extend from the exterior surface of the form fitting clothing and extend into the gas or fluid stream that is moving along the body of athlete.

The height of very small surfaces is the same order of magnitude as the boundary layer height on the exterior surface of the air vehicle, ground vehicle, water vehicle, or athletes body.

Aerodynamic braking and/or control and hydrodynamic braking and/or control are obtained by controlling the separation of the flow about a very large number of small protuberances distributed over the vehicle or body surface. The small protuberances extend from the exterior surface of the vehicle or body and into the flow that is passing over the exterior surface of the vehicle or body. More specifically, this invention relates to a device and method for affecting aerodynamic drag and/or braking and hydrodynamic drag and/or braking of a vehicle or body utilizing specifically shaped and with a specific distribution of a large number of very small protuberances.

The Micro-Drag Generator concept employs both ridge-type very small surfaces and point type very small surfaces. Ridge-type Micro-Drag Generator surfaces have a length that is an order of magnitude greater than the height they extend from the surface. The ridge-type Micro-Drag Generators are to be orientated within 30 degrees of perpendicular to the free-stream flow direction. For the various vehicle applications and the athletic clothing applications of ridge-type Micro-Drag Generators, the resulting external surface appears corrugated with very small (micro) surfaces. The streamwise spacing between successive rows of ridge-type Micro-Drag Generator surfaces should be between 5 and 15 times the height that the Micro-Drag Generator surface extends above the exterior surface of the vehicle. Point-type Micro-Drag Generator surfaces have a length that is the same order of magnitude as their height. Point-type Micro-Drag Generator surfaces are aligned in rows to simulate a corrugated surface. The rows of point-type Micro-Drag Generators must be orientated within 30 degrees of perpendicular to the free-stream flow direction. The orientation of each point-type Micro-Drag Generator surface is to be such as to maximize the projected area in the free-stream flow direction. For the various vehicle applications and the athletic clothing applications of point-type Micro-Drag Generators, the resulting external surface would have rows of very small (micro) bumps/surfaces.

Each Micro-Drag Generator surface is designed to generate a small drag force that contributes to the total drag force of the Micro-Drag Generator system and the total drag of the host vehicle or athlete. A properly designed Micro-Drag Generator system can achieve a drag level of greater than 500% of the host vehicle or athlete. Each of these very small Micro-Drag Generator surfaces of this invention generates a very small amount of drag force without disrupting the flow field surrounding the vehicle or athlete. The very small force acting on each of the large number of very small surfaces allows for the use of lightweight, minimum volume, micro actuators that are integral with the vehicle surface structure or a single actuator that moves all of the small Micro-Drag Generator surfaces. The very small force acting on each of the large number of very small surfaces allows for the use of lightweight and thin material to be fabricated into the athlete's uniform.

The invention may be used to provide drag for braking and control of all existing and future aircraft, both in flight and on the ground, present and future ground vehicles (i.e., cars, trucks, buses, trains, etc.), water vehicles (i.e., sailboats, motorboats, barges, transports, submarines, etc.) and humans moving through a liquid or gas.

OBJECTS AND ADVANTAGES

Several objects and advantages of the present invention are:

(a) to provide an aerodynamic or hydrodynamic drag production device that uses a very large number of very small surfaces;

(b) to allow the very large number of very small surfaces to be actuated and moved into the fluid stream;

(c) to allow the surface contour of each of the very small surfaces to be variable to meet the specific needs of the application;

(d) to allow the spacing, location, and orientation of each of the very small surfaces to be variable to meet the specific needs of the application;

(e) to allow the structure of the very small surfaces to be rigid or flexible;

(f) to allow the very small surfaces to be inflatable;

(g) to actuate and move each of the large number of very small devices by means of surface integrated actuator systems such as micro-electronic-mechanisms, shape memory alloys, micro actuators, pneumatics, and/or smart materials;

(h) to create a large number of small drag forces that are used to provide resistance for athletes in training;

(i) to allow for the actuation and movement of any single, group, or all of the very small surfaces (j) to create a large number of very small drag forces that are used to brake or turn the vehicle;

(k) to provide braking of a vehicle by a symmetric actuation of the device surfaces relative to the vehicle principle axes;

(l) to provide control of a vehicle by an asymmetric actuation of the device surfaces relative to the vehicle principle axes;

(m) to allow the device to be fabricated as an independent unit that may be applied to an existing vehicle;

(n) to allow for optimal positioning of each very small surface in the vehicle flow field;

(o) to have minimum weight and require minimum volume within the vehicle;

(p) to have minimum maintenance requirements;

(q) to maximize the safety of vehicle operation during braking;

Further objects and advantages are to provide a device that can be easily and conveniently used to create drag on any air, ground, or water vehicle for the purposes of braking and controlling the movement of the vehicle. The objects and advantages also extend to other applications in which either a gas or fluid is in use such as for the flow in pipes or ducts. The objects and advantages are to provide a device that can easily and conveniently be used to create training resistance for athletes without disrupting their normal body movements or increasing the risk of injury. The device may be used as an exercise aid to increase the resistance felt by athletes in swimming, skiing, and bicycle racing. Still further objects and advantages will become apparent from a consideration of the ensuing description and drawings.

BRIEF DESCRIPTION OF THE DRAWINGS

FIG. 1A is a top and side view of a tractor-trailer rig with Micro-Drag Generators installed for aerobraking.

FIG. 1B is a top view of a commercial transport aircraft with Micro-Drag Generators installed for control and aerobraking.

BEST MODE FOR CARRYING OUT THE INVENTION

Figure 1C:
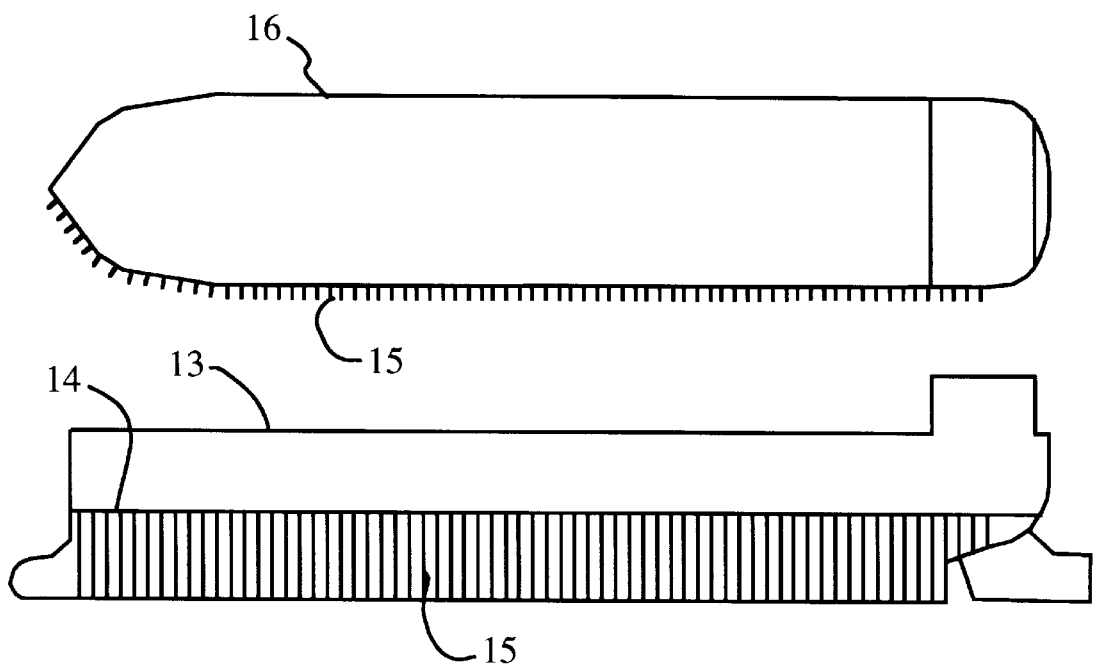
FIG. 1C is a top and side view of a sea-fairing transport (e.g., oil tanker) with Micro-Drag Generators for hydrobraking and turning.

Referring now in detail to the drawings, like numerals herein designate like numbered parts in the figures.

FIG. 1A is a depiction of the application of Micro-Drag Generators to the trailer of a tractor-trailer rig. The left side of the figure depicts a conventional tractor-trailer rig 1 comprised of a tractor 2 and trailer 3. The conventional rig is designed with a smooth surface 4. In FIG. 1A, the conventional tractor-trailer rig 1 also represents of a tractor-trailer rig with Micro-Drag Generators 5, when not deployed. When Micro-Drag Generators are not deployed, they do not add any additional drag to the vehicle (e.g., tractor-trailer rig). On the right side of the figure is shown the surface 4 of a trailer with Micro-Drag Generators 5 deployed. When the Micro-Drag Generators 5 are deployed, it has been shown from wind-tunnel tests that up to 7 times the drag of the not deployed case can be achieved.

FIG. 1B is a depiction of the application of Micro-Drag Generators to a transport aircraft. An aircraft is typically comprised of a fuselage 6, wings 7, engine nacelles 8, tail 9, and control surfaces 10. The top half of FIG. 1B represents a conventional aircraft with smooth skin 11. The bottom half of FIG. 1B represents an aircraft with Micro-Drag Generators 12 deployed on the fuselage 6, wing 7, and engine nacelles 8. The conventional aircraft with smooth skin (top half of FIG. 1B) also represents an aircraft without Micro-Drag Generators 12 deployed. When the Micro-Drag Generators 12 are, not deployed flush with the surface, they do not add any additional drag to the vehicle. When the Micro-Drag Generators 12 are deployed (as shown on the bottom half of FIG. 1B), it has been shown from wind-tunnel tests that up to 7 times the drag of the not deployed case. This drag increase is used to decelerate the aircraft upon landing and would reduce the wear on the landing-gear brakes, and be more effective when runway conditions are wet or icy. If Micro-Drag Generators 12 are deployed on one side of the aircraft only, then a yawing moment and a rolling moment can be generated similar to deploying conventional control effectors 10. These moments can be used for controlling the aircraft in flight or assist in turning the vehicle while on the ground (e.g., taxiing).

FIG. 1C depicts the application of Micro-Drag Generators to a ship 13. Shown in the upper half of the figure is a top view of the ship 13 (with the front of the ship pointing to the left of the page) and shown on the lower half of the figure is the side view of the ship 13. The ship 13 of FIG. 1C may be divided up into the area below the water as noted by the waterline 14 and the area above the waterline 14. The side view of the ship (shown in the bottom half of FIG. 1C) show Micro-Drag Generators 15 deployed on the left-hand (port) side of the ship 13. The top view of the ship 13 (shown in the upper half of FIG. 1C) also show Micro-Drag Generators 15 deployed on the left-hand (port) side of the ship and show a conventional smooth side 16 on the right-hand (starboard) side of the ship 13. The smooth right-hand (starboard) side of the ship depicted in FIG. 1C also represents the condition in which Micro-Drag Generators are not deployed and are flush with the surface 16. For this condition, the Micro-Drag Generators 15 do not add any additional drag to the ship. When the Micro-Drag Generators 15 are deployed, it has been shown from tests that up to 7 times the drag of the not deployed case is achieved.

Figure 1D:
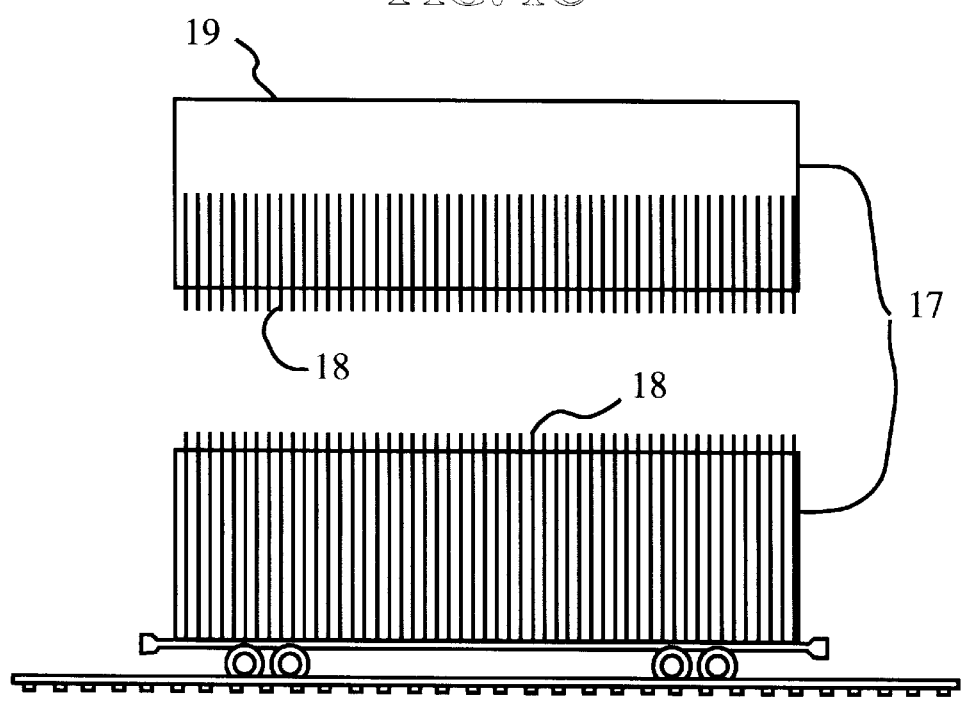
FIG. 1D is a top and side view of a typical railcar with Micro-Drag Generators installed for aerobraking.

FIG. 1D is the application of Micro-Drag Generators to a railcar 17. Shown in the upper half of the figure is a top view of the railcar 17 and shown on the lower half of the figure is the side view of the railcar 17. The Micro-Drag Generators 18 are shown not deployed on the right-hand side of the top view of the figure, and flush with the surface 19 (on the right-hand side of the top view of the figure), thus, do not add any additional drag to the vehicle (e.g., rail car). When the Micro-Drag Generators 18 are deployed, it has been shown from wind-tunnel tests that up to 7 times the drag of the not deployed case.

Figure 1E:
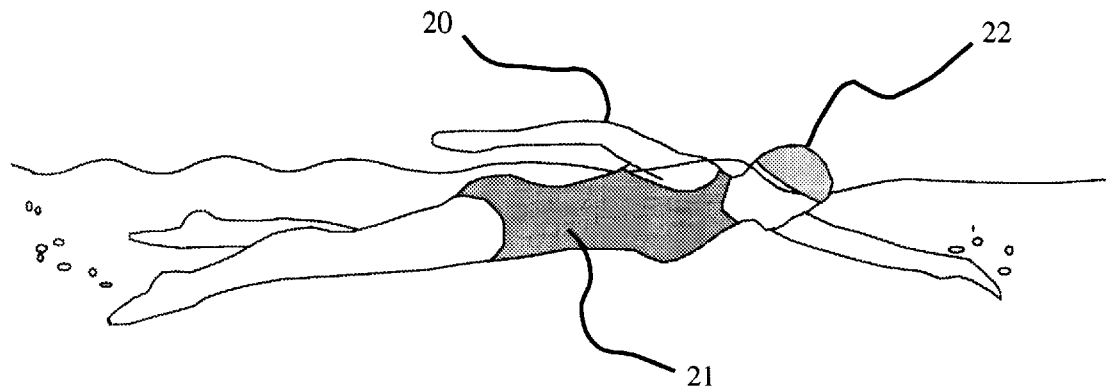
FIG. 1E is a side view of a typical swimmer in training with a typical uniform (or swimsuit).

A side view of a swimmer 20 in a typical swimsuit 21 and swim cap 22 are shown in FIG. 1E.

Figure 1F:
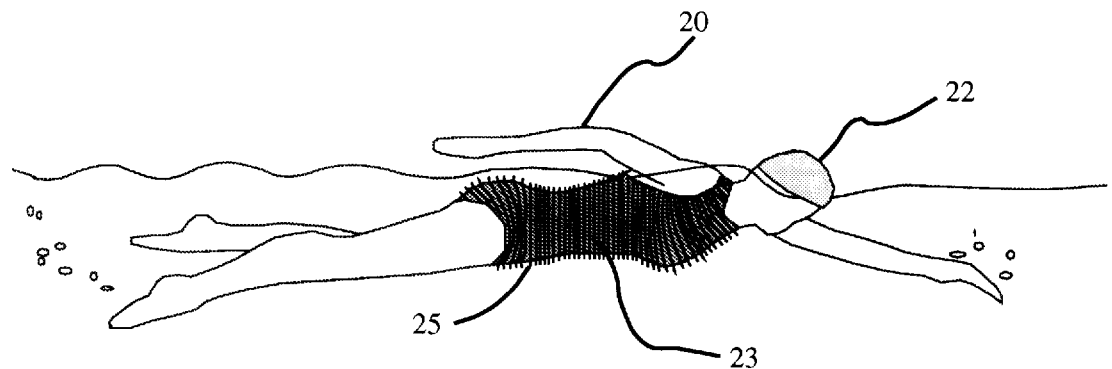
FIG. 1F is a side view of a typical swimmer in training with Micro-Drag Generators integrated into the uniform (swimsuit) for increased resistance.
Figure 1F:
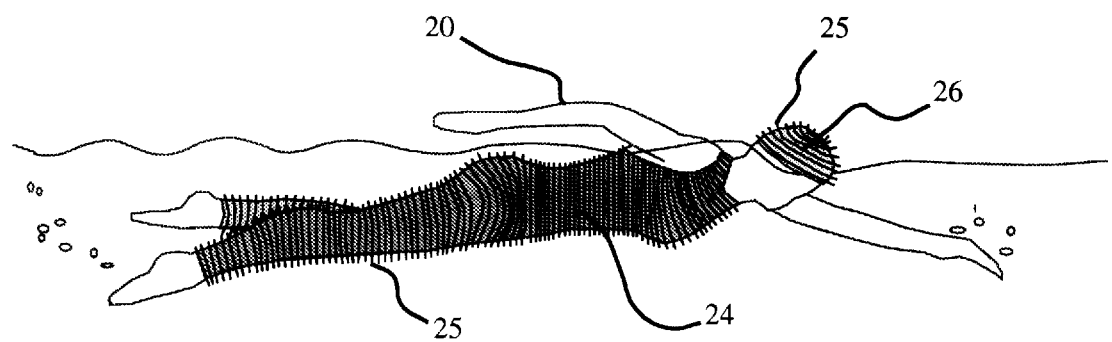

In FIG. 1F, a swimmer 20 with a modified swimsuit 23, 24 and swim cap 26 are shown. This modification would increase the drag of the swimmer 20 and thus, the resistance providing a more difficult workout. The increased resistance is achieved by the addition of Micro-Drag Generators 25 to the surface of the fabric of the swimsuit 23, 24 and/or swim cap 26.

FIG. 2 illustrates some of the methods for actuating the Micro-Drag Generators and depicts some of the shapes of Micro-Drag Generators. In FIGS. 2A and 2B, a plate Micro-Drag Generator is actuated into the flowfield from surface 27. In FIG. 2A, the plate Micro-Drag Generator 28 is rotated into the flowfield to be become plate Micro-Drag Generator 29. 28 is the plate Micro-Drag Generator in the not deployed position and 29 is the plate Micro-Drag Generator in the deployed position. In FIG. 2B, the plate Micro-Drag Generator 30 is slid or pushed into the flowfield from surface 27. 30 is the plate Micro-Drag Generator in the not deployed position and 31 is the plate Micro-Drag Generator in the deployed position. In FIGS. 2C and 2D, hemispherical bumps or semicircular cylinders Micro-Drag Generators are represented. In FIG. 2C, the bump or cylinder-shaped Micro-Drag Generator 33 is shown in its deflated (i.e., not deployed) 33 position and its inflated position 34. The bump or cylinder Micro-Drag Generator 33 could be inflated with air or other fluid, or the use of SMAs (Smart Material Actuators such as Rainbows, Thunder, piezo-electrics or piezo-ceramics, etc.) could be utilized. FIG. 2G shows a bump or cylinder Micro-Drag Generator 33 that is not circular or spherical in shape. This Micro-Drag Generator would be actuated the same as the Micro-Drag Generators in FIG. 2C, however, the aspect ratio of the deployed or inflated state 34 would be much higher (i.e., much taller bumps or cylinders could be achieved). FIG. 2D illustrated how a hemispherical bump or semicircular cylinder Micro-Drag Generator 35 could be rotated into the flowfield. The underside of the bump or cylinder Micro-Drag Generator 35 in the not deployed state would be flush with the surface 27 and not add additional drag to the configuration. The stowed bump or cylinder Micro-Drag Generator 35 could be rotated about a shaft 37 and deployed into the flowfield to become bump or cylinder Micro-Drag Generator 36. FIGS. 2F and 2H are quarter-circular cylinder or quarter-spherical bump Micro-Drag Generators that would be rotated into the flowfield similar to FIG. 2D. FIGS. 2F and 2H show the bump or cylinder Micro-Drag Generators 40, 42 in their not deployed state and the bump or cylinder Micro-Drag Generators 41, 43 in the deployed state. These Micro-Drag Generators would be deployed by rotating about a shaft 37. FIG. 2E shows how a bi-stable material could be used to deploy a Micro-Drag Generator into the flowfield. This triangular Micro-Drag Generator 38 shown in the stowed position where the bi-stable material would be flush with the surface 27 and not add additional drag to the vehicle. When the bi-stable material is actuated (by heat, electricity, magnetism, or by a nudge from another actuator), it would jump to its deployed state and create the triangular Micro-Drag Generator 39.

Figure 3A:
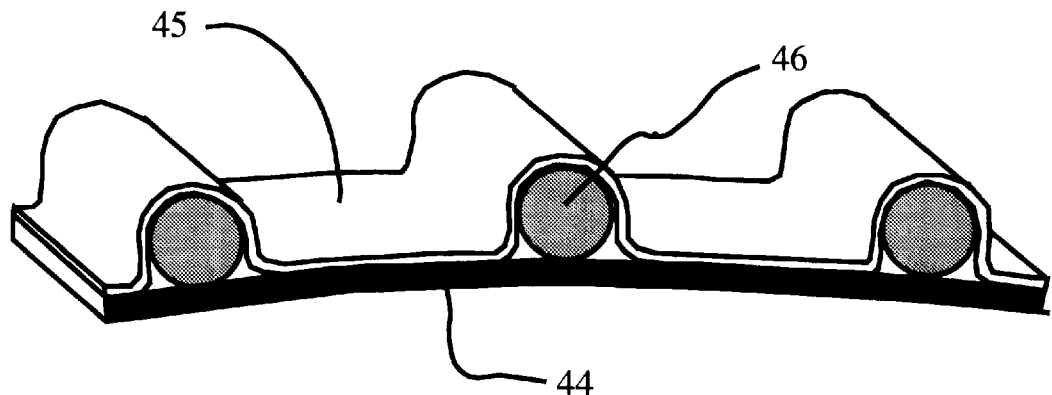
FIGS. 3A through 3B are examples of how Micro-Drag Generators could be fabricated into athletic training uniforms.
Figure 3B:
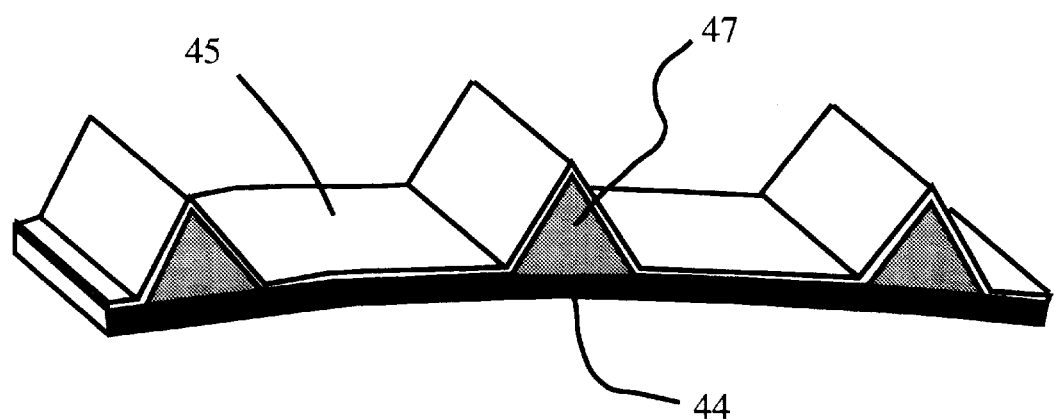

FIGS. 3A and 3B illustrate how Micro-Drag Generators could be embedded into the material of a swimsuit or swim-cap. The sublayer 44 would be the normal swimsuit or swim-cap material. The Micro-Drag Generator material 46, 47 would be made of a plastic or rubber and could be fixed to an optimum size or could be inflated to vary the size and thus, the amount of resistance required. FIG. 3A illustrates a circular-shaped Micro-Drag Generator 46 and FIG. 3B illustrates a triangular-shaped Micro-Drag Generator 47, however, square, rectangular, and oval cross-sectional shaped Micro-Drag Generators could just as easily be employed. An outer material 45 would be attached or sewn over the Micro-Drag Generator to keep them in the proper location for producing the most drag or resistance to the athlete.

Figure 4A:
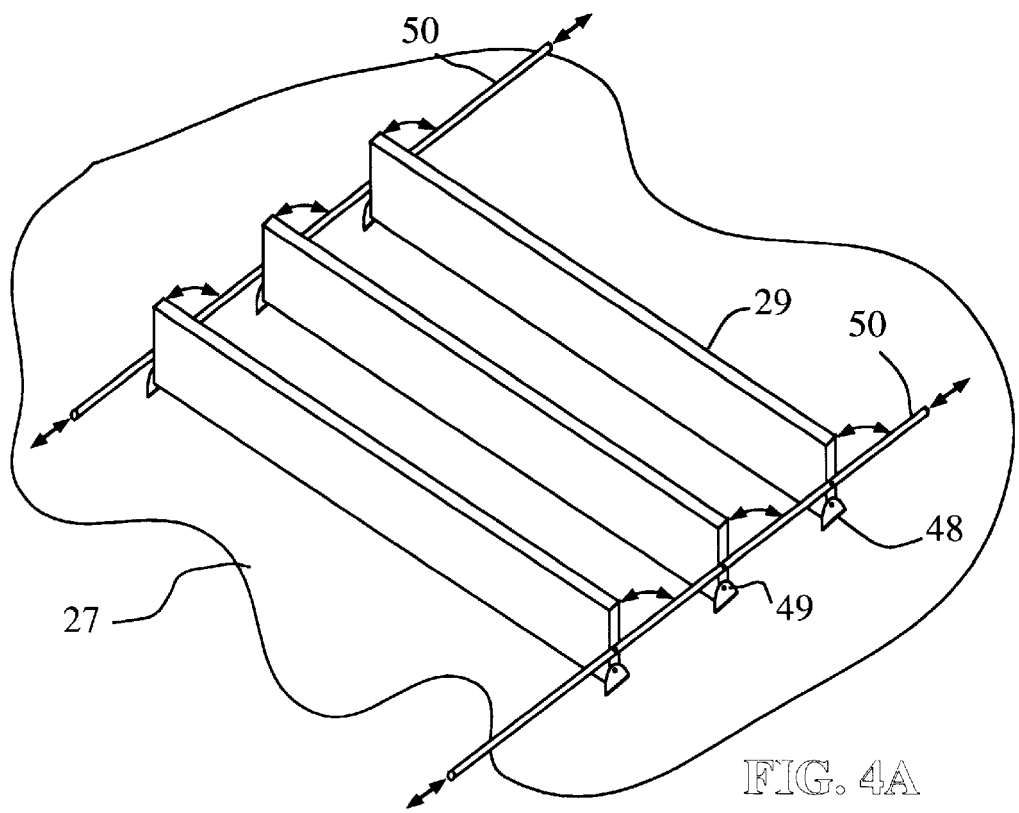
FIG. 4A shows how Micro-Drag Generator plates could be actuated into the flowfield.

FIG. 4A illustrates how a series of plates could be deflected into the flowfield. This figure is an example of one method of deploying the Micro-Drag Generators 29 shown in FIG. 2A. Here a series of plates are connected by rod 50 to an actuator (not shown). The actuator would move the rod back and forth, moving the plate Micro-Drag Generator 28 from the not deployed position to the deployed condition, plate Micro-Drag Generator 29. The plates would rotate about a pin 49 on a hinge 48.

Figure 2A:
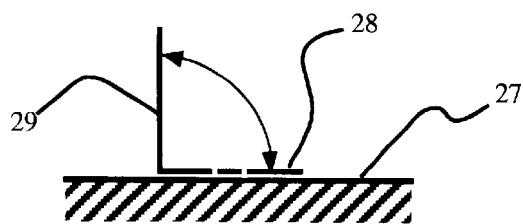
FIGS. 2A through 2H are examples of how an Micro-Drag Generator could be actuated.
Figure 2C:
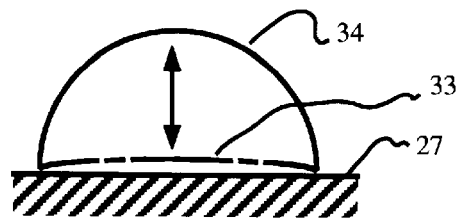
Figure 2B:
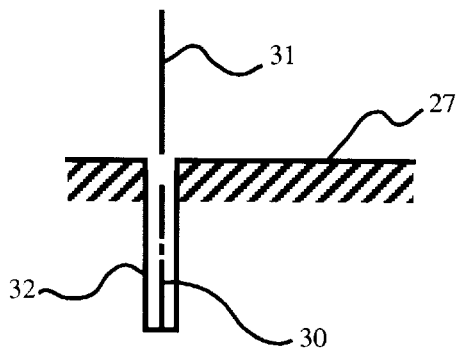
Figure 2D:
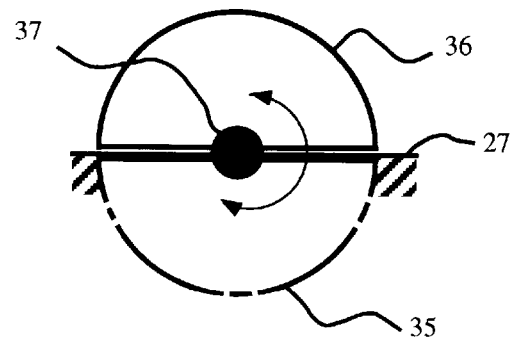
Figure 2E:
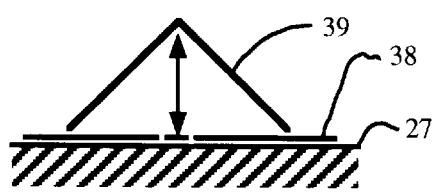
Figure 2G:
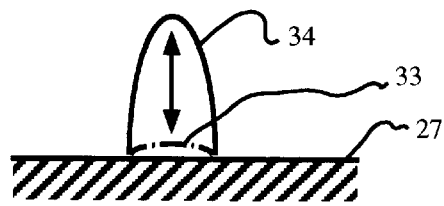
Figure 2F:
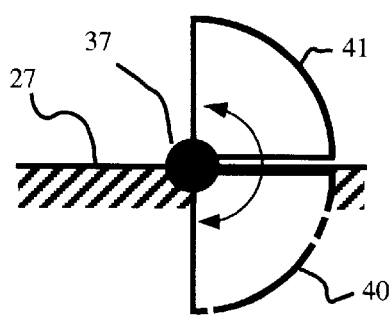
Figure 2H:
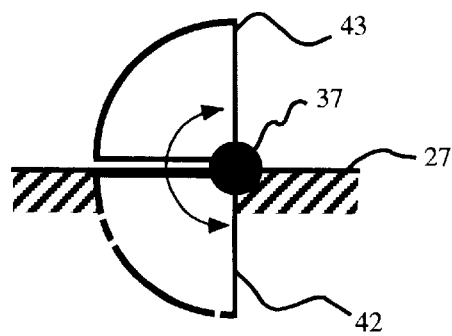
Figure 4B:
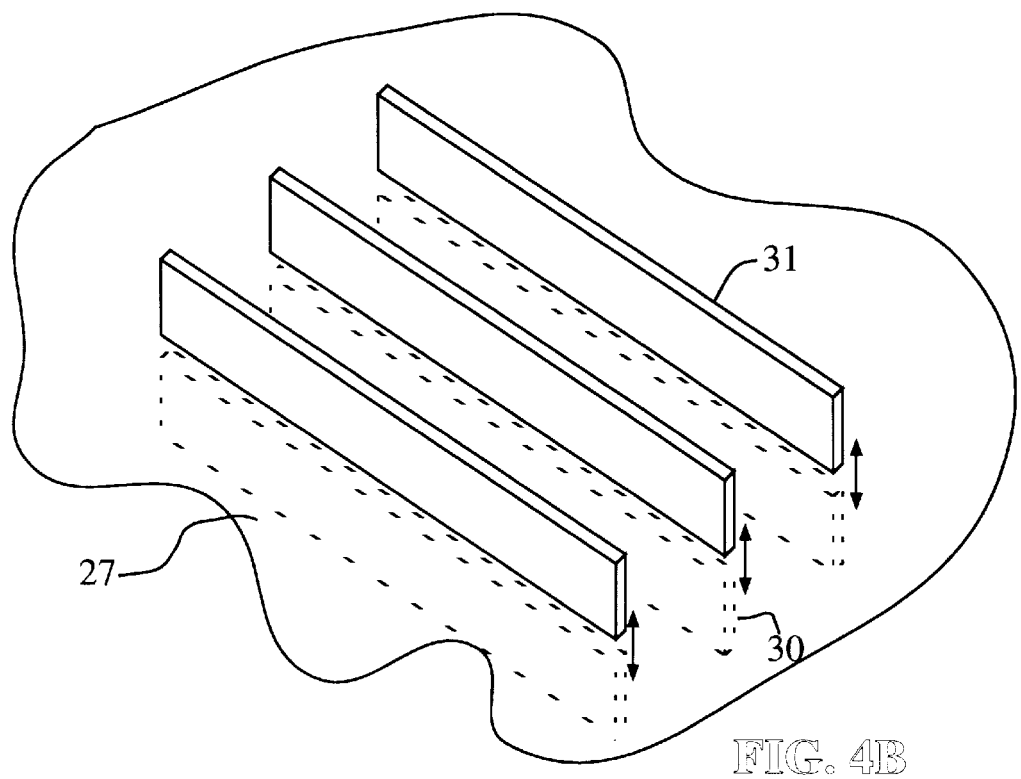
FIG. 4B shows another method of how Micro-Drag Generator plates could be actuated into the flowfield.

FIG. 4B illustrates another method of deploying a series of plate Micro-Drag Generators 31 into the flowfield (by the method referred to in FIG. 2B). In this figure, the plate Micro-Drag Generators could be moved from their not deployed state 30 to their deployed state 31 by utilizing pressurized air, hydraulics, springs, actuators, or a combination of the listed devices.

Figure 5A:
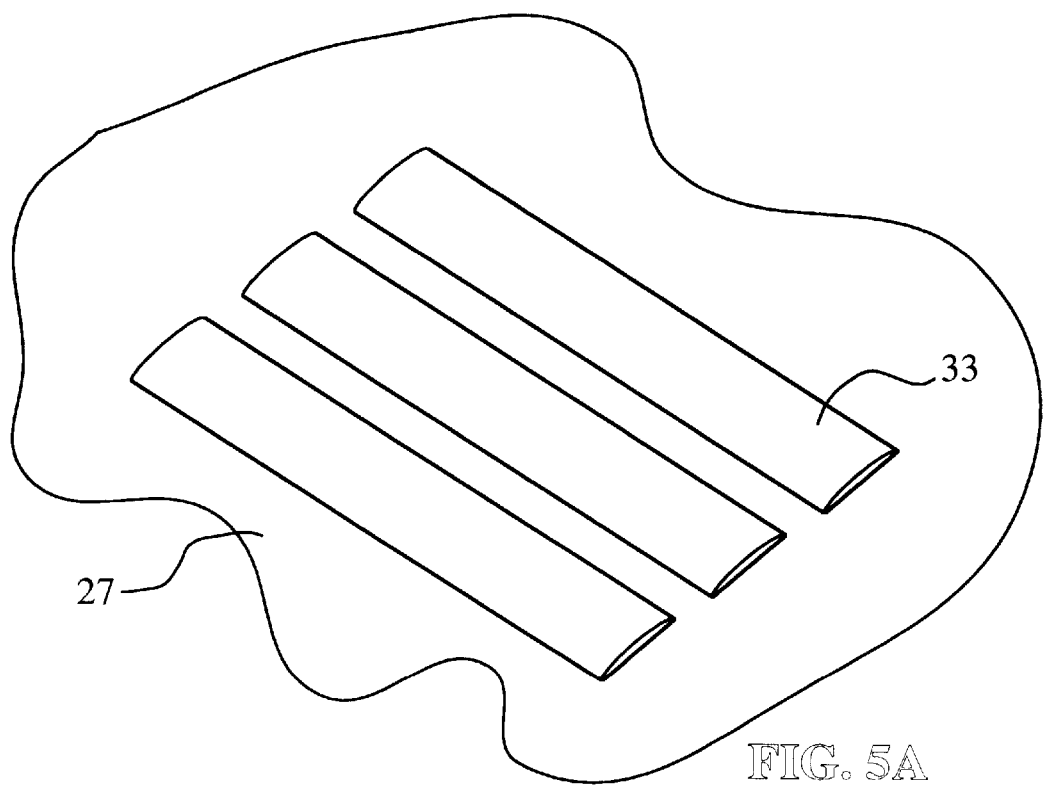
FIG. 5A shows deflated Micro-Drag Generator bumps.
Figure 5B:
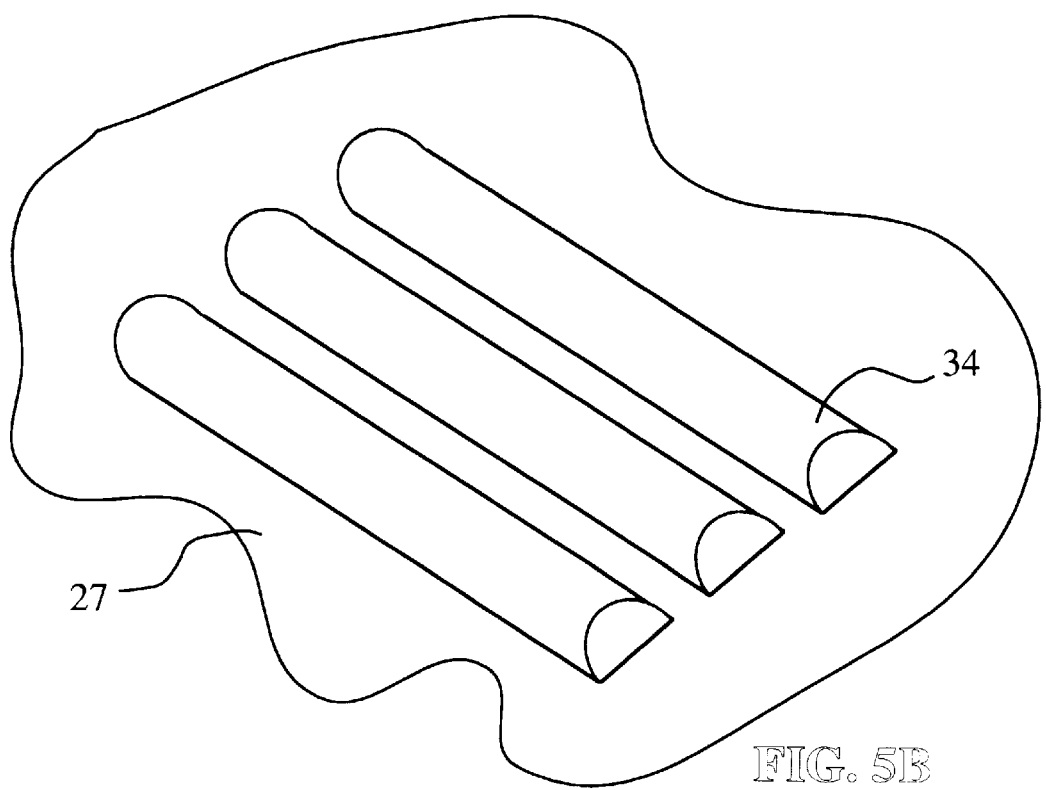
FIG. 5B shows them inflated.
Figure 6A:
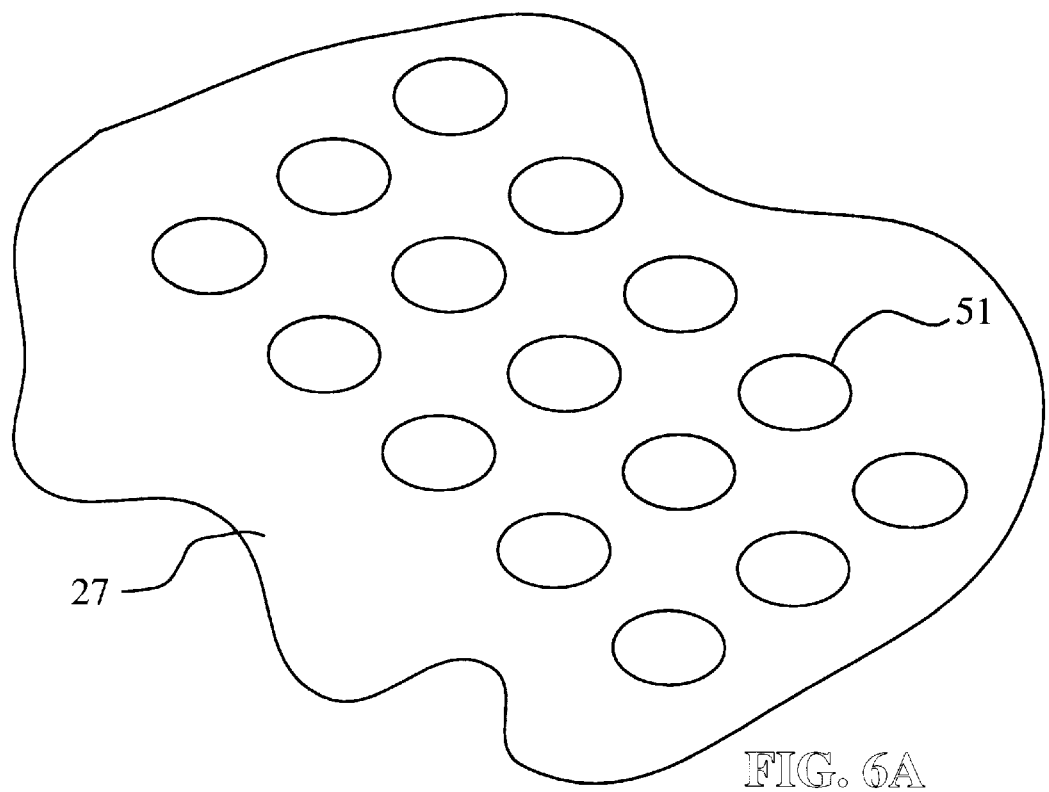
FIG. 6A shows a series of deflated hemispherical bumps Micro-Drag Generators and FIG. 6B shows them inflated into the flowfield.
Figure 6B:
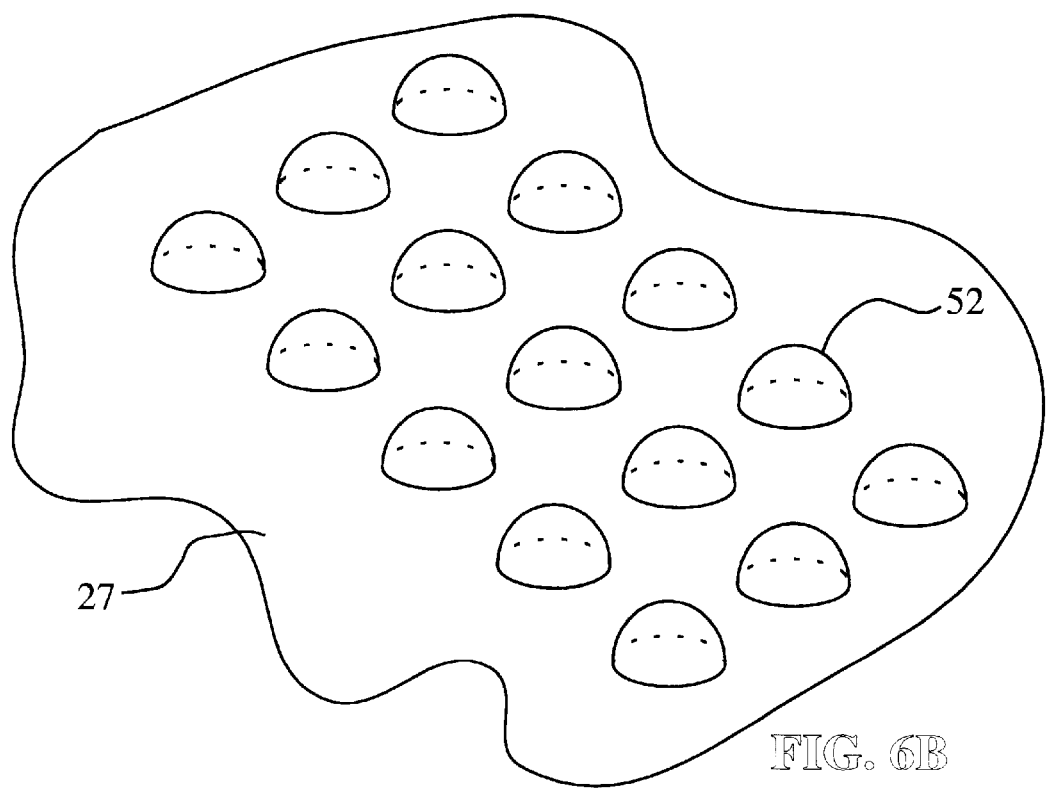

In FIGS. 5 and 6, inflatable Micro-Drag Generators are described. FIG. 5A shows a series of deflated (not deployed) semicircular cylinder Micro-Drag Generators 33. FIG. 6A shows a series of hemispherical deflated (not deployed) bump Micro-Drag Generators 51. FIG. 5B shows the inflated (deployed) semicircular cylinder Micro-Drag Generators 34 and FIG. 6B shows the inflated (deployed) hemispherical bump Micro-Drag Generators 52.

Figure 7A:
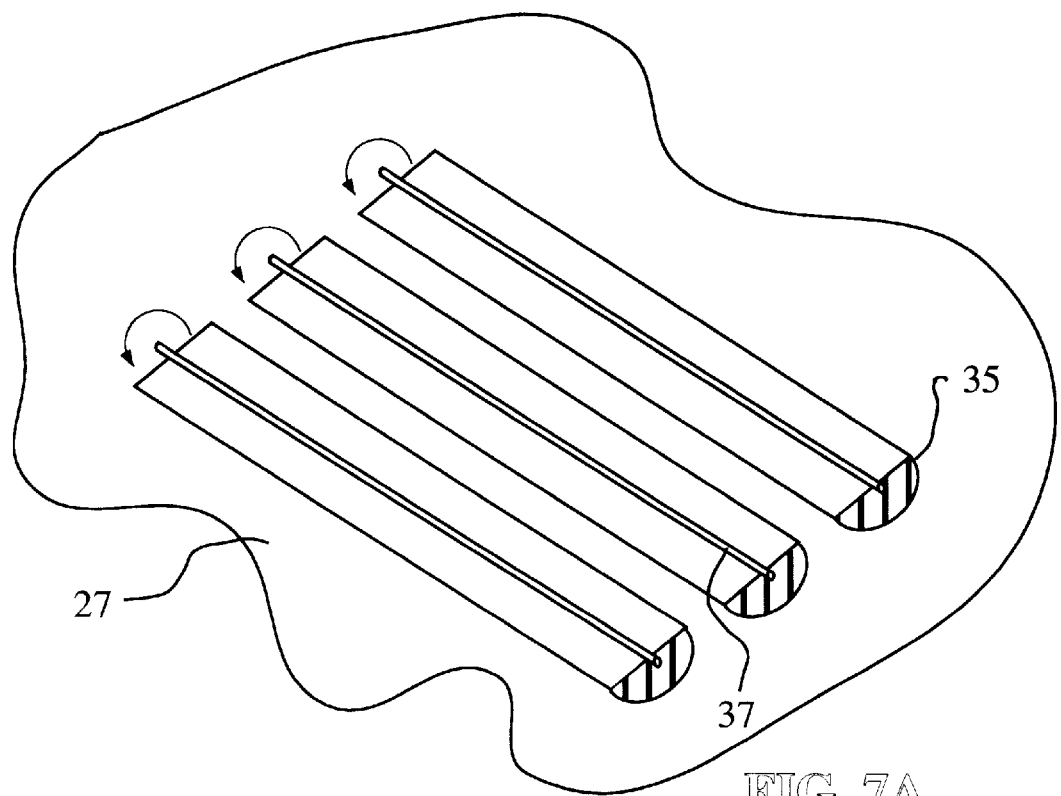
FIG. 7A shows semicircular-cylinders (Micro-Drag Generators) in the stowed position and FIG. 7B shows them rotated into the flowfield.
Figure 7B:
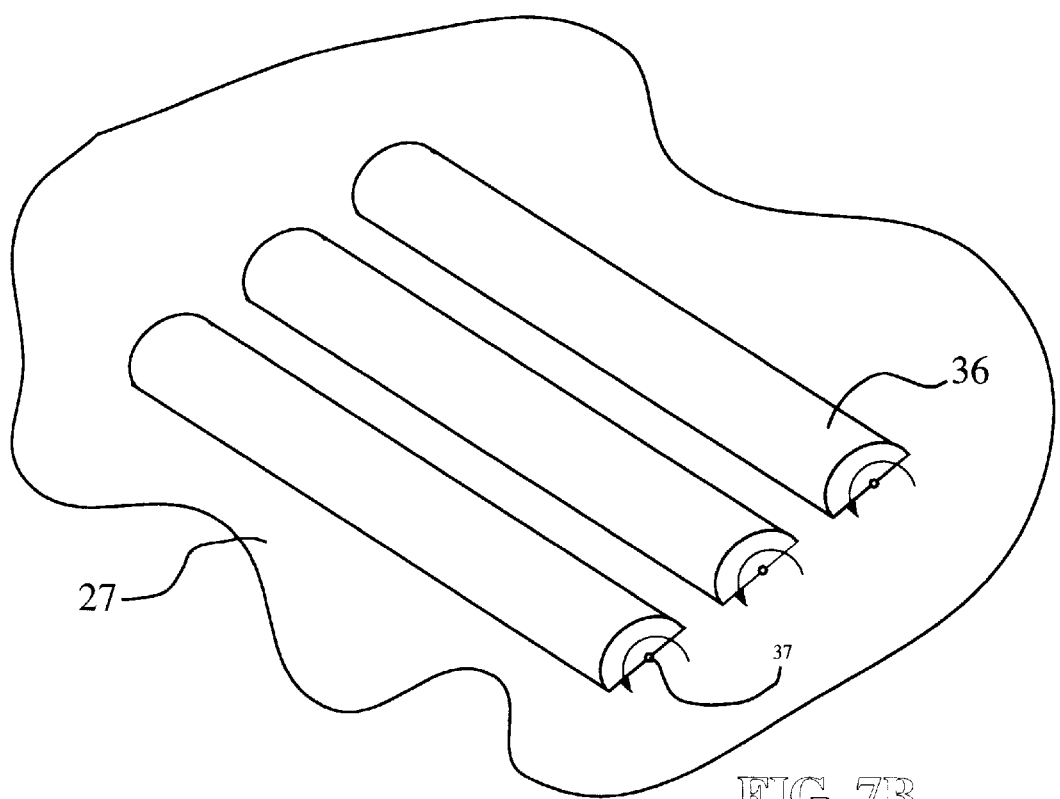

In FIGS. 7A and 7B, the rotatable semi-circular bump (or hemispherical bumps not shown) Micro-Drag Generators are depicted. FIG. 7A shows the cylinder Micro-Drag Generators 35 in their not deployed state. By rotating the shaft 37, the cylinder Micro-Drag Generators 36 would rotate into the flowfield, as shown in FIG. 7B.

Figure 8A:
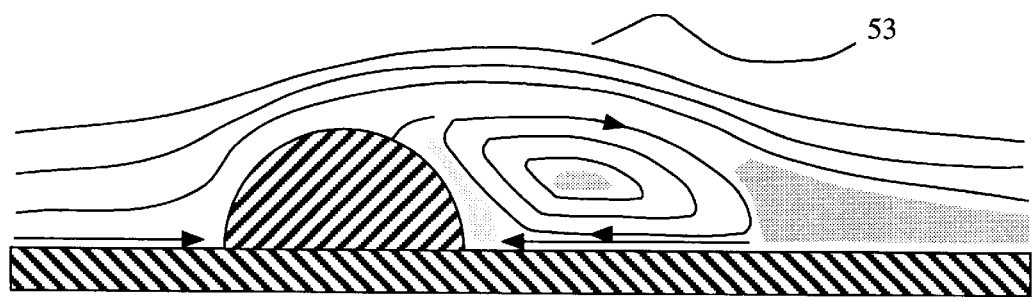
FIG. 8A illustrates the localized flow field characteristics about deployed Micro-Drag Generator.
Figure 8A:
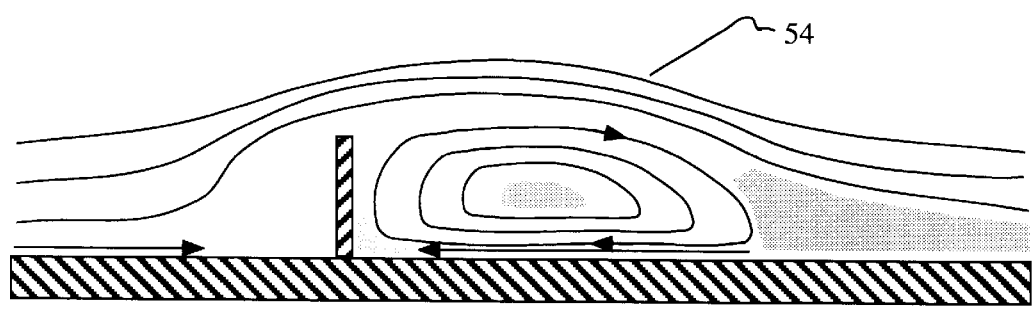

In FIG. 8A, the flowfields, 53 and 54, which occur in the region of Micro-Drag Generators, are depicted. The illustration represents a flow moving from left to right across the figure. Shown in the upper half of the figure is a hemispherical Micro-Drag Generator 34, 36, shown in FIGS. 2C and 2D, and in the lower half of the figure is a vertical plate Micro-Drag Generators 29, 31, shown in FIGS. 2A and 2B. The flowfield, 53 and 54, show that the flow is attached upstream of the Micro-Drag Generators and separates on the downstream side of the Micro-Drag Generators. The flowfield reattaches to the surface downstream of the Micro-Drag Generators. This pattern of separation followed by reattachment repeats along the flow direction as the flow encounters each succeeding row of Micro-Drag Generators.

Figure 8B:
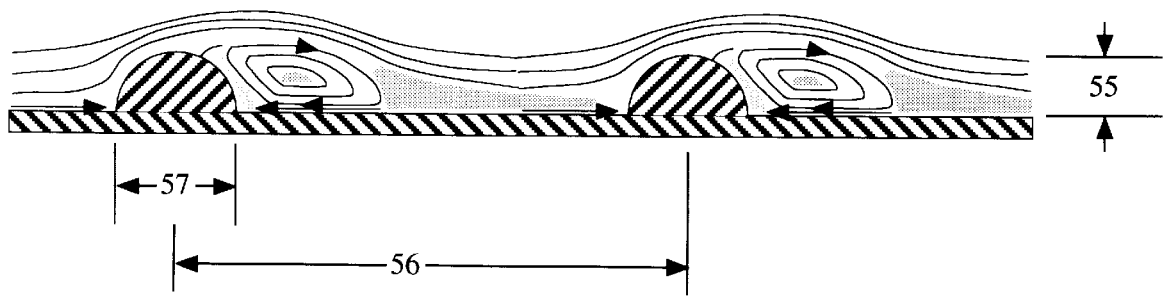
FIG. 8B illustrates the required height, width and spacing requirements for Micro-Drag Generator.

In FIG. 8B, the specific height 55, width 57, and streamwise spacing 56 requirements for the Micro-Drag Generators concept are illustrated. The height 55 of Micro-Drag Generators is the same order of magnitude as the boundary layer height on the vehicle or body in the location of the Micro-Drag Generator. The streamwise spacing 56 between successive rows of Micro-Drag Generator surfaces should be between 5 and 15 times the height 55 that the Micro-Drag Generator surface extends above the exterior surface of the vehicle. Micro-Drag Generator surfaces should have a width 57 that is the same order of magnitude as their height 55. Micro-Drag Generator surfaces are aligned in rows to simulate a corrugated surface. The rows of Micro-Drag Generators must be orientated within 30 degrees of perpendicular to the free-stream flow direction. The orientation of each Micro-Drag Generator surface is to maximize the projected area in the free-stream flow direction.

Figure 9:
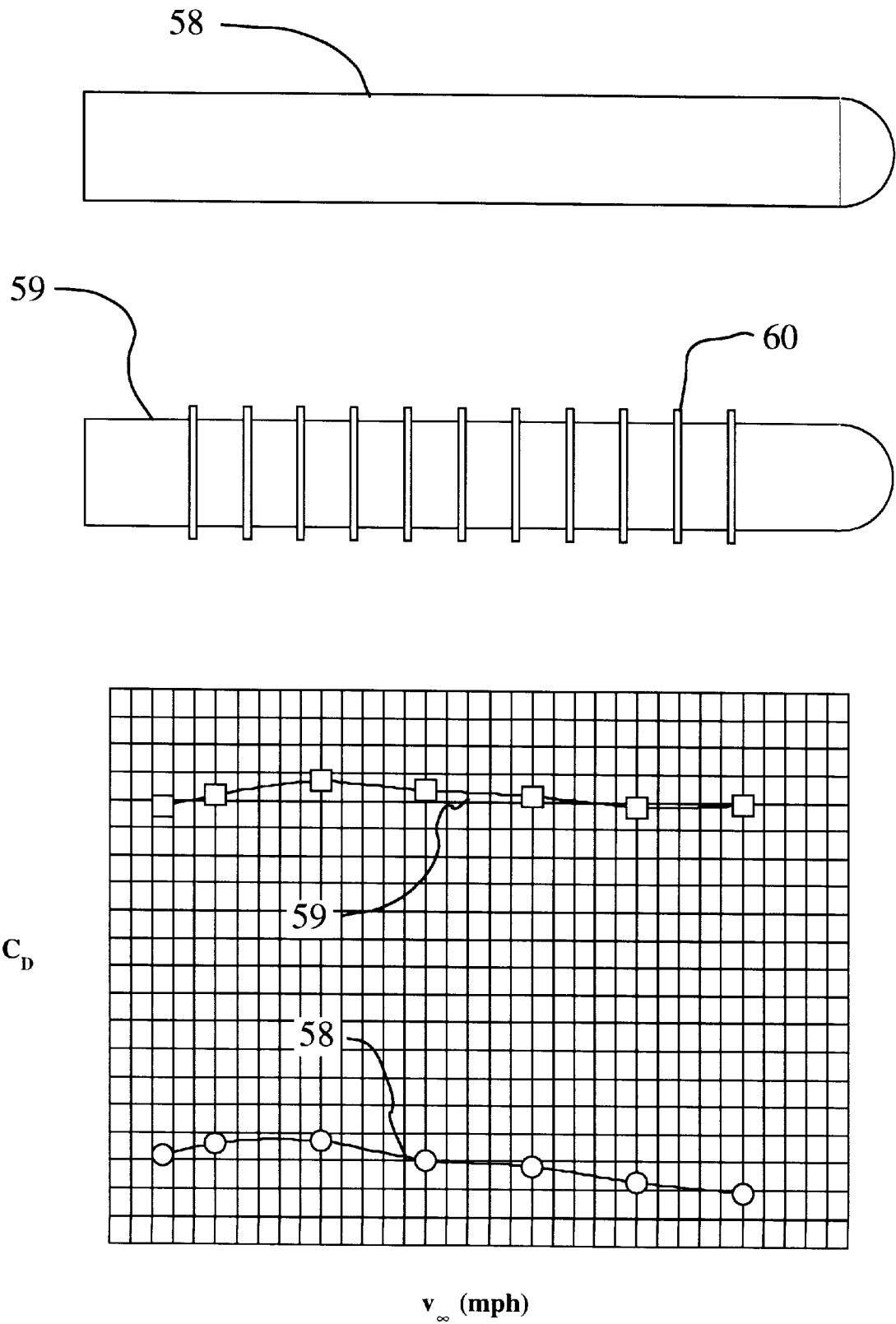
FIG. 9 illustrates the measured aerodynamic drag coefficient for an axisymmetric body with and without Micro-Drag Generators deployed.

In FIG. 9, the drag coefficients for an axisymmetric body without Micro-Drag Generators 58 and an axisymmetric body with Micro-Drag Generators 59 are shown. The data presented is for vertical plate Micro-Drag Generators 60. The data show a maximum increase in drag coefficient of 500% for the plate Micro-Drag Generators 60 tested.

Figure 10:
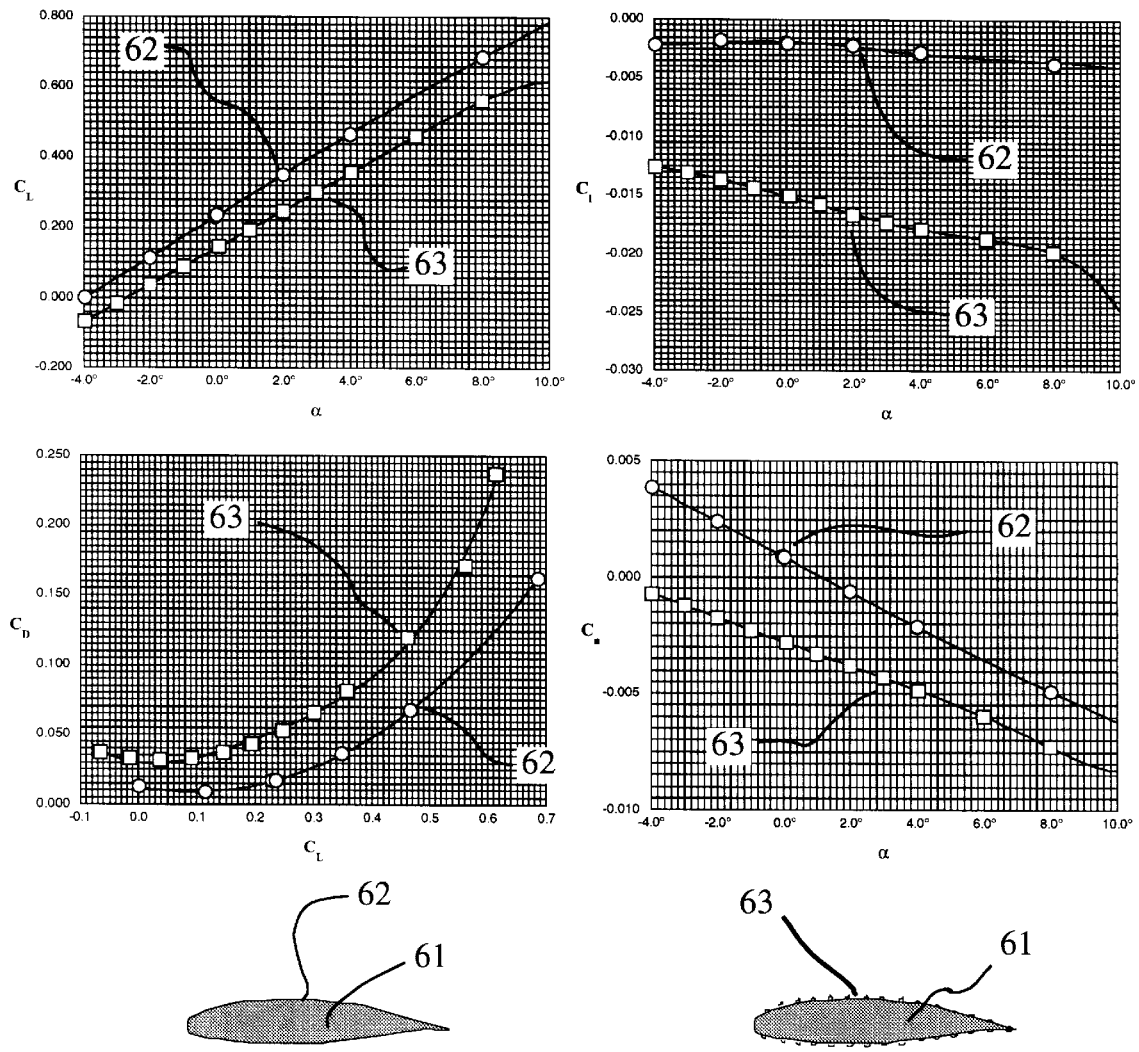
FIG. 10 illustrates the measured aerodynamic drag, lift, rolling-moment, and yawing-moment coefficients associated for an unswept wing with and without Micro-Drag Generators deployed on the left-hand side of the wing.

In FIG. 10, the drag, lift, rolling-moment, and yawing-moment coefficients for an unswept wing 61 with a smooth surface 62 and an unswept wing with hemispherical bump type Micro-Drag Generators 63 deployed. Note, the wing 61 with smooth surface 62 also represents a typical wing with hemispherical bump type Micro-Drag Generators 63 in the stowed position. The data of FIG. 10 show a maximum increase in drag coefficient of 500% and a significant change in all aerodynamic control parameters for the wing with Micro-Drag Generators compared to the smooth surface wing.

Figure 11B:
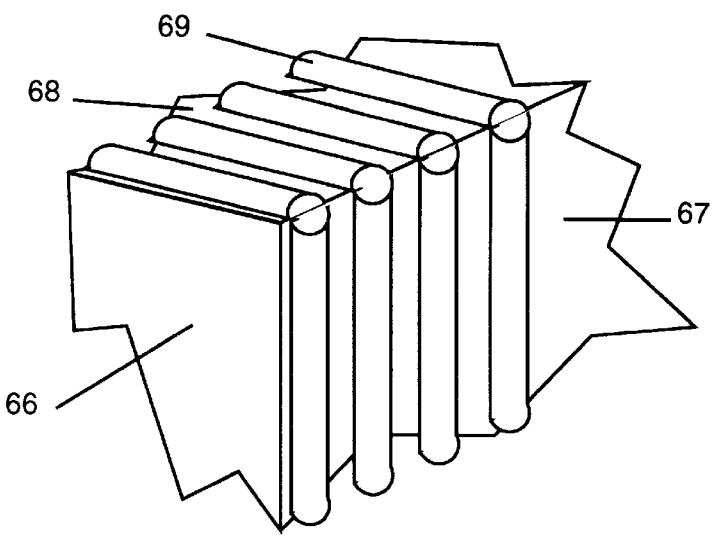
FIG. 11B illustrates inflatable hemispherical cylinder Micro-Drag Generators surfaces that have been deployed on the forward upper right corner of the trailer of a tractor-trailer rig
Figure 11A:
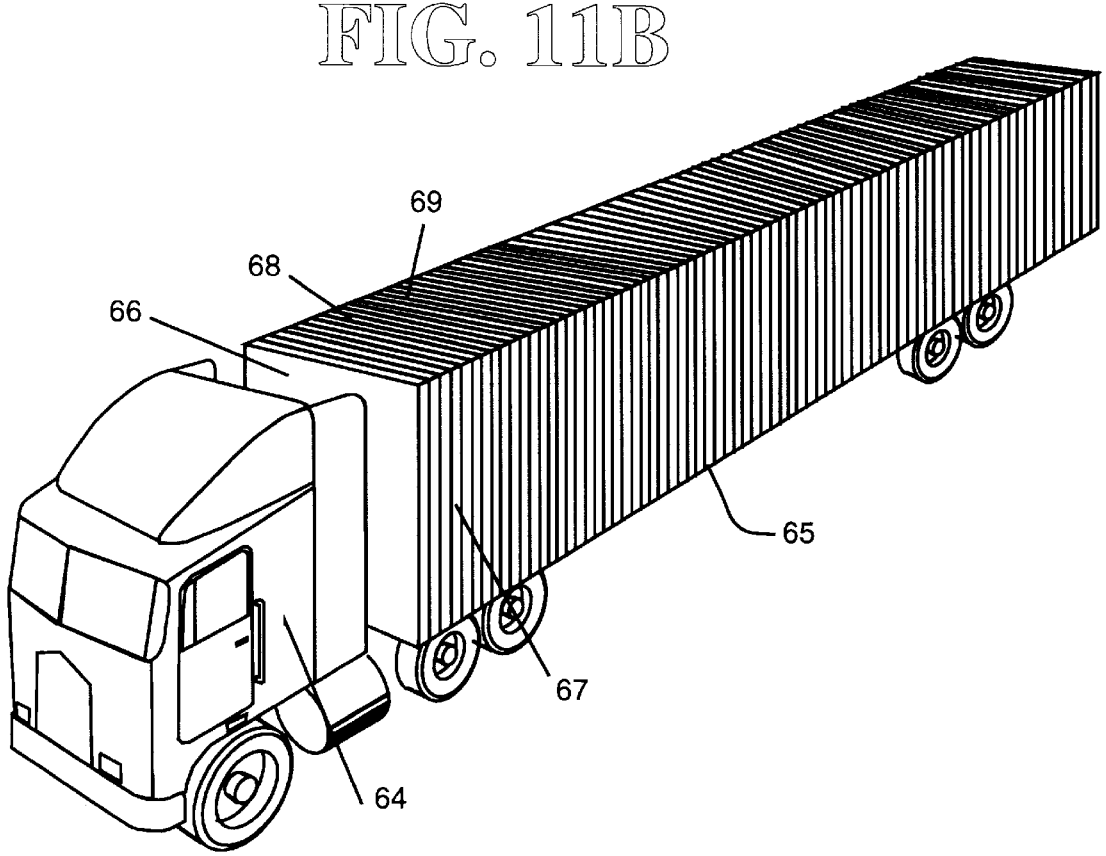
FIG. 11A illustrates a tractor-trailer rig with inflatable hemispherical cylinder Micro-Drag Generators surfaces that have been deployed on the top and side of the trailer.

FIG. 11A is a depiction of a tractor-trailer rig comprised of a tractor 64 and trailer 65, with front 66, sides 67 (only left side shown), and top 68. FIG. 11A depicts inflatable hemispherical cylinder Micro-Drag Generators surfaces 69 that have been deployed on the top 68 and sides 67 of the trailer 65. The deployed Micro-Drag Generators 69 of FIG. 11A would increase the drag of the trailer 65 500%. When Micro-Drag Generators 69 are not deployed, they do not add any additional drag to the vehicle (e.g., tractor-trailer rig).

FIG. 11B is a depiction of the forward upper left corner of the trailer 65 of the tractor-trailer rig. The front 66, sides 67 (only left side shown), and top 68 portion of the trailer 65 are depicted in FIG. 11B. FIG. 11B also depicts the inflatable hemispherical cylinder Micro-Drag Generator surfaces 69 that have been deployed on the top 68 and sides 67 of the trailer 65. The depicted Micro-Drag Generator surfaces 69 of FIG. 11B are aligned perpendicular to the flow direction, approximately one inch in height, and successive rows separated by approximately five inches. The inflatable hemispherical cylinder Micro-Drag Generators surfaces 69 are actuated by a quick acting compressed air system (not shown) in response to a signal indicating a desire for braking (i.e., the MDG actuation mechanism could be tied into the existing friction braking system utilized by the vehicle).

Advantages

From the description provided above, a number of advantages of the micro-drag generators become evident:

(a) The invention may be easily applied to any existing vehicle or designed into any new vehicle.

(b) The invention may be designed and fabricated as a flexible sheet and/or glove that can be attached to any surface.

(c) The invention may be designed and fabricated as material that can be made into athletic apparel.

(d) The invention allows for the loss in operation of a number of single actuated surfaces without affecting the total system performance.

(e) The matching of a complex surface shape is easily simulated by the large array of very small surfaces.

(f) Large drag forces can be generated by the summation of a very large number of very small drag values.

(g) The independent actuation of a single, group, or all of the very small surfaces allows for a wide variety of specific needs to be met.

(h) The structure of each single very small surface may be rigid or flexible to meet specific performance or vehicle integration requirements.

(i) Each single very small surface may be inflatable to meet specific performance or vehicle integration requirements.

(j) The shape of each single very small surface may be planar, cylindrical, or combinations thereof to meet specific performance or vehicle integration requirements.

(k) The actuation and movement of each of the large number of very small devices may be achieved by means of surface integrated actuator systems such as micro-electronic-mechanisms, shape memory alloys, micro actuators, pneumatics, and/or smart materials.

(l) The ability to create a large number of very small drag forces to be used in any combination to brake or turn the vehicle.

(m) The ability to provide a continuously variable braking force on a vehicle by symmetric actuation of the device surfaces relative to the vehicle principal axes.

(n) The ability to provide a continuously variable control force on a vehicle by an asymmetric actuation of the device surfaces relative to the vehicle principal axes.

(o) The ability to optimally position each very small surface in the vehicle flow field.

(p) The ability to minimize weight and volume requirements within the vehicle.

(q) The ability to minimize maintenance requirements.

(r) The ability to maximize the safety of vehicle operation during braking.

Conclusion, Ramifications, and Scope

Accordingly, the reader will see that the micro-drag generator device of this invention can be used to easily and conveniently create drag on any air, ground, or water vehicle for the purposes of braking and controlling the movement of the vehicle. This invention can be used to easily and conveniently create drag for resistance training of athletes. The objects and advantages also extend to other applications in which either a gas or fluid is in use such as for the flow in pipes or ducts. The device may be used as an exercise aid to increase the resistance felt by athletes in swimming, skiing, and bicycle racing. Furthermore, the very small size and large number of surfaces has the additional advantages in that:

it provides a distributed aerodynamic or hydrodynamic drag force;

it allows the contour of the host surface to be easily matched;

it allows easy application to any existing vehicle or designed into any new vehicle;

it allows the system to be designed and fabricated as a flexible sheet and/or glove that can be attached to any surface;

it allows the system to be designed and fabricated as material that can be made into athletic apparel;

it allows the structure of the very small surfaces to be rigid or flexible;

it allows the very small surfaces to be easily inflatable;

it allows the actuation and movement of each of the large number of very small devices by means of surface integrated actuator systems such as micro-electronic-mechanisms, shape memory alloys, micro actuators, pneumatics, and/or smart materials;

it allows for the actuation and movement of any single, group, or all of the very small surfaces;

it allows the device to be fabricated as an independent unit that may be applied to an existing surface;

it allows for optimal positioning of each very small surface in the vehicle flow field;

it allows the design of a system with minimum weight and to require minimum volume within the vehicle;

it allows minimum maintenance requirements;

it allows for the maximum safety of vehicle operation during braking;

Although the description above contains many specificities, these should not be construed as limiting the scope of the invention but as merely providing illustrations of some of the presently preferred embodiments of this invention. For example, the very small drag producing surfaces can have other cross-sectional shapes such as circular, oval, trapezoidal, triangular, etc.; the planform shape can be triangular, elliptic, etc.; the material can be rubber, plastic, metal, composites, etc.; the actuation mechanism can be electric, hydraulic, pneumatic, smart material, etc.; the substrate can be metal, wood, plastic, composite, rubber, ceramic, etc.; the application surface can be that of a metal, wood, plastic, composite, rubber, ceramic, etc.

Thus, the scope of the invention should be determined by the appended claims and their legal equivalents, rather than by the examples given.

We claim:

1. An aerodynamic or hydrodynamic drag producing device comprising a significant portion of the exterior surface of a vehicle moving through a gas or liquid;

said aerodynamic or hydrodynamic drag producing device comprising a plurality of very small surfaces distributed on the vehicle exterior surface, said plurality of small surfaces are symmetrically distributed about the vehicles principle longitudinal axis, said very small surfaces are arranged in approximately equally spaced rows in the streamwise direction, each of said very small surfaces are aligned approximately perpendicular to the local surface flow direction, each of said very small surfaces extends outward from the exterior surface of the said vehicle a distance equal to the distance of order of the local boundary layer thickness of the said vehicle, each of said very small surfaces may be of arbitrary cross section shape, each of said very small surfaces has a width equivalent to the height said very small surface extends outward from the exterior surface of the said vehicle, each of said surface has a length equal to or greater than the height the said very small surface extends outward from the exterior surface of the said vehicle, each of said very small surfaces may be rapidly deployed to a drag producing position, each of said very small surfaces may be rapidly stowed to a non-drag producing position, quick-acting actuating mechanisms operatively associated with each said very small surfaces for rapidly deploying and rapidly stowing each of said very small surfaces, means for energizing said actuating mechanisms in response to a signal indicating the desire for braking of said vehicle to symmetrically deploy said very small surfaces when braking is desired and to stow the said very small surfaces when braking is not desired, means for energizing a limited number of said actuating mechanisms in response to a signal indicating the desire for turning of said vehicle to asymmetrically deploy selected said very small surfaces when turning is desired and to stow the selected said very small surfaces when braking is not desired.

2. An aerodynamic or hydrodynamic drag producing device of claim 1 wherein the very small surface is rigid.

3. An aerodynamic or hydrodynamic drag producing device of claim 1 wherein the very small surface is flexible.

4. An aerodynamic or hydrodynamic drag producing device of claim 1 wherein the very small surface may be inflatable.

5. An aerodynamic drag-producing device as specified in claim 1 wherein said vehicle is an air vehicle.

6. An aerodynamic drag-producing device as specified in claim 1 wherein said vehicle is a ground vehicle.

7. A hydrodynamic drag-producing device as specified in claim 1 wherein said vehicle is a water vehicle.

8. An aerodynamic or hydrodynamic drag producing device comprising a significant portion of the exterior surface of the form-fitting training uniform worn by an athlete moving through a gas or liquid;

said aerodynamic or hydrodynamic drag producing device comprising a plurality of very small surfaces distributed on the surface of the said form-fitting uniform worn by the said athlete, said plurality of small surfaces are symmetrically distributed about the said uniform, said very small surfaces are arranged in approximately equally-spaced rows in the streamwise direction of the gas or liquid would be passing over the said athlete and said uniform, each of said very small surfaces are aligned approximately perpendicular to the local surface flow direction passing over the said athlete and said uniform, each of said very small surfaces extends outward from the said uniform exterior surface a distance equal to the order of the local boundary layer thickness on the said uniform, each of said very small surfaces may be of arbitrary cross section shape, each of said very small surfaces has a width equivalent to the height said very small surface extends outward from the exterior surface of the said uniform, each of said surface has a length equal to or greater than the height the said very small surface extends outward from the exterior surface of the said uniform.

9. An aerodynamic or hydrodynamic drag producing device of claim 7 wherein the very small surface is rigid.

10. An aerodynamic or hydrodynamic drag producing device of claim 7 wherein the very small surface is flexible.

11. An aerodynamic or hydrodynamic drag producing device of claim 7 wherein the very small surface may be inflated.

12. A hydrodynamic drag-producing device as specified in claim 7 wherein said athlete is a swimmer.

13. An aerodynamic drag-producing device as specified in claim 7 wherein said athlete is a runner or walker.

14. An aerodynamic drag-producing device as specified in claim 7 wherein said athlete is a bicyclist.

15. An aerodynamic drag-producing device as specified in claim 7 wherein said athlete is a skier.

16. A method for increasing the aerodynamic or hydrodynamic drag on a object moving through a gas or liquid comprising the following steps;

modifying the exterior surface of the object to contain a plurality of very small surfaces distributed on the surface, said plurality of small surfaces are symmetrically distributed about the objects principle longitudinal axis, said very small surfaces are arranged in approximately equally spaced rows in the streamwise direction, each of said very small surfaces are aligned approximately perpendicular to the local surface flow direction, each of said very small surfaces extends outward from the exterior surface of the said object a distance equal to the distance of order of the local boundary layer thickness on the said object, each of said very small surfaces may be of arbitrary cross section shape, each of said very small surfaces has a width equivalent to the height said very small surface extends outward from the exterior surface of the said object, each of said surface has a length equal to or greater than the height the said very small surface extends outward from the exterior surface of the said object.

17. An aerodynamic drag-producing device as specified in claim 16 wherein said object is an air vehicle.

18. An aerodynamic drag-producing device as specified in claim 16 wherein said object is a ground vehicle.

19. A hydrodynamic drag-producing device as specified in claim 16 wherein said object is a water vehicle.

20. A hydrodynamic drag-producing device as specified in claim 16 wherein said object is an athlete.

* * * * *